Figure 1:
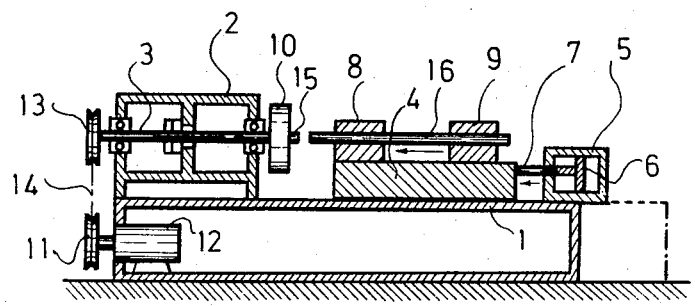

United States Patent
Fukaya et al.

[15] 3,698,617
[45] Oct. 17, 1972

[54] APPARATUS FOR OPTIONALLY SELECTING THRUST FORCE APPLIED TO THE WORKPIECES IN THE FRICTION WELDING

[72] Inventors: Shigeo Fukaya, 38-1, Miyoshicho Duza Myochiazu Fukanhazama, Nishikamo-gun, Aichi-ken; Nobuo Takagi, 50-36, Daza Ogahieaza Kamisawawatari, Kariya-shi, Aichi-ken, both of Japan

[22] Filed: Feb. 10, 1969

[21] Appl. No.: 797,772

[30] Foreign Application Priority Data

Feb. 10, 1968  Japan ........................43/8492

[52] U.S. Cl. .....................228/2, 29/470.3, 91/415, 91/448
[51] Int. Cl. .............................................B23k 27/00
[58] Field of Search ...29/470.3; 228/2; 156/73; 91/6, 91/415, 448

[56] References Cited

UNITED STATES PATENTS

| | | | |
|---|---|---|---|
| 2,780,204 | 2/1957 | Barley | 91/415 X |
| 3,185,368 | 5/1965 | Holloway et al. | 228/2 |
| 3,235,159 | 2/1966 | Walton et al. | 228/2 |
| 3,235,160 | 2/1966 | Walton | 29/470.3 UX |
| 3,434,392 | 3/1969 | Landers | 91/415 X |
| 3,451,121 | 6/1969 | Yocum | 228/2 X |
| 3,476,016 | 11/1969 | Dixon et al. | 91/415 X |
| 3,479,924 | 11/1969 | Ferguson | 91/415 X |
| 3,497,660 | 2/1970 | Henry-Biabaud | 91/6 X |
| 2,855,752 | 10/1958 | Le Brusque | 91/31 X |

FOREIGN PATENTS OR APPLICATIONS 1,229,930   3/1960   France........................91/415

*Primary Examiner*—John F. Campbell
*Assistant Examiner*—Ronald J. Shore
*Attorney*—Robert E. Burns and Emmanuel J. Lobato

[57] ABSTRACT

Apparatus for optionally selecting a first thrust force required for generating heat by the frictional contact between two workpieces and a second thrust force larger than the first thrust force for performing an upset operation during a friction welding operation. Two series of thrust force generating systems are selectively combined to actuate a hydraulic cylinder of the friction welder. In a typical embodiment, one thrust force generating system is used for generating the thrust force required for performing the upset operation while the other thrust force generating system is used for generating the thrust force required for generating heat. The above-mentioned combination of thrust forces is optionally selected by a fluid circuit comprising a plurality of electromagnet valves, pressure reducing valves and their connections.

9 Claims, 7 Drawing Figures

APPARATUS FOR OPTIONALLY SELECTING THRUST FORCE APPLIED TO THE WORKPIECES IN THE FRICTION WELDING

The present invention relates to an apparatus for optionally selecting the thrust force applied to workpieces during a friction welding operation, and more particularly, relates to a novel apparatus for optionally selecting a first thrust force which suitable for generating heat by frictional contact of the workpieces and a second thrust force for performing an upset operation.

Attempts have been made in the past to select the thrust force applied to the workpieces optionally by means of two regulating valves disposed in an oil circuit attached to the friction welder. In such attempts, the oil pressure applied to a fluid-actuated piston and cylinder of the friction welder for pressing one workpiece to the other workpiece works in such a way that the thrust force applied to the workpieces proportionally depends upon the oil pressure. However, only a single system of generating the thrust force is used to in the conventional friction welder in order to obtain a series of high thrust forces during the friction welding, therefore, it is very difficult to generate an accurate first thrust force in a domain of low thrust force of the above-mentioned system of generating the thrust force.

On the contrary, if the above-mentioned single system of generating the thrust force is exchanged with a system which is possible to generate a series of low thrust forces during the friction welding operation in order to raise the level of accuracy of the first thrust force, it is impossible to obtain the required high thrust force necessary to operate the upset operation.

The object of the present invention is to provide a novel apparatus for optionally selecting a combination of the first thrust force and the second thrust force in a wide range and precise condition by means of plural systems each generating the thrust force to the desired fluid-actuated means of the friction welder the above-mentioned drawbacks are eliminated.

The invention will be better understood from the following description in connection with the accompanying drawings and its scope will be pointed out in the appended claims.

Figure 3:
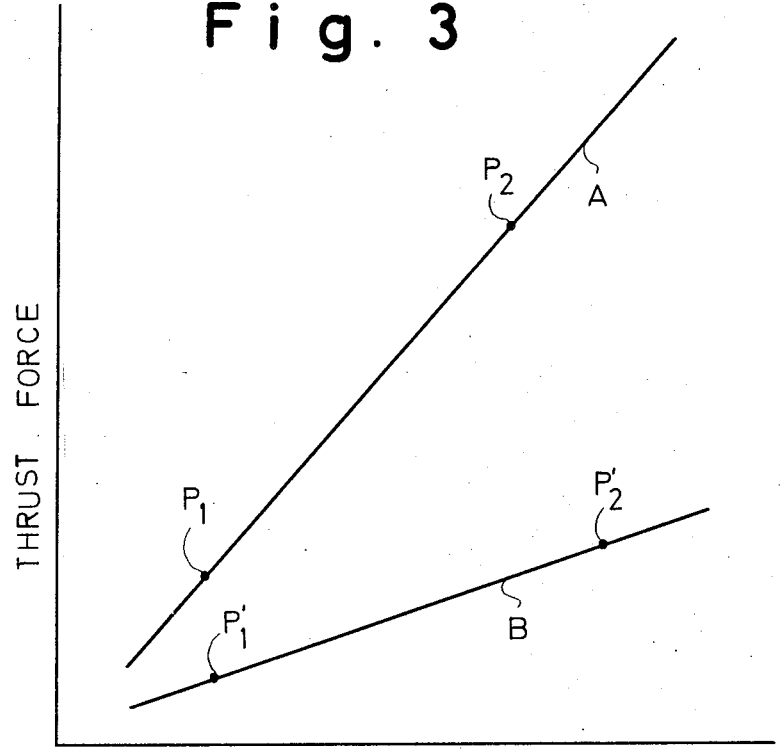
Figure 2:
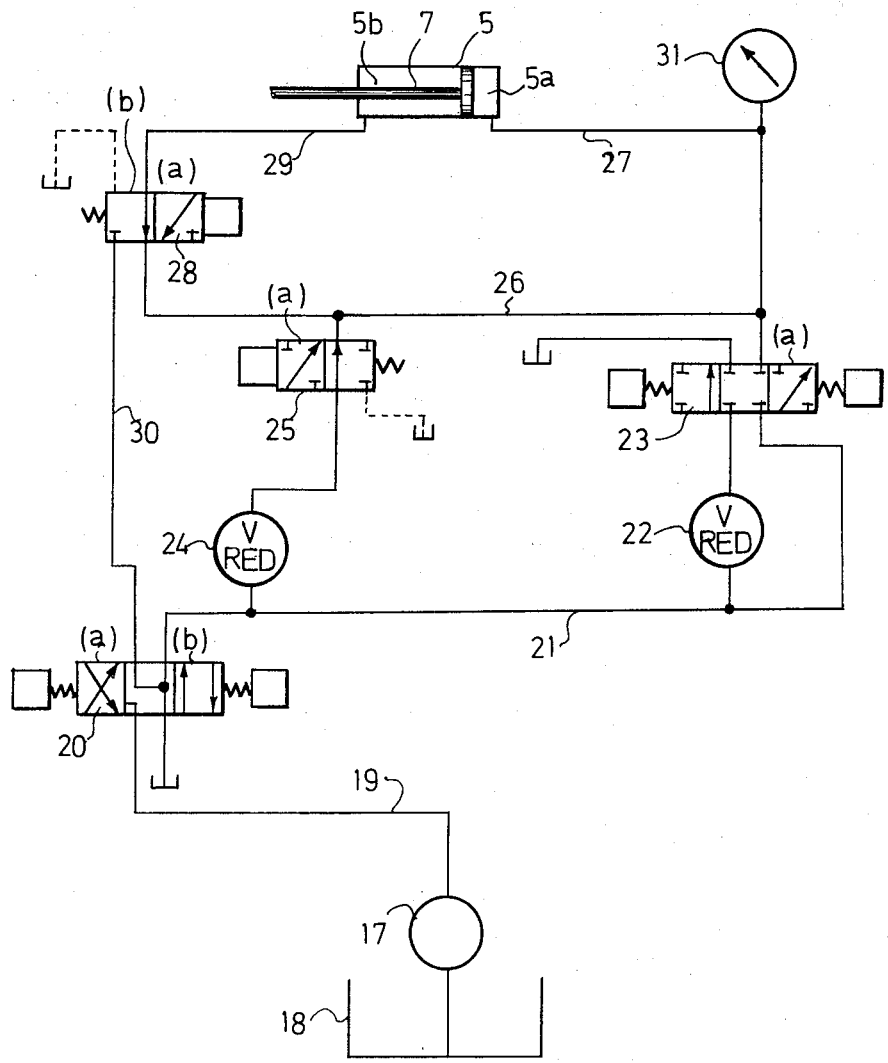

FIG. 1 is a schematic side view, partly in section, of a friction welder attached an apparatus for optionally selecting the first contact pressure or the second contact pressure according to the present invention, FIG. 2 is a schematic diagram of the oil pressure circuit used in the apparatus of the present invention, FIG. 3 is an explanatory diagram showing a relation between the thrust force applied to the workpieces and a gauge pressure of the pressure oil circuit shown in FIG. 2, FIGS. 4A, 4B, 4C, and 4D are explanatory diagrams showing the operation systems of the apparatus shown in FIG. 2.

For easy understanding of the present invention, an embodiment of the apparatus for optionally and alternatively selecting the first contact pressure or the second contact pressure will first be explained.

Referring to FIG. 1, a friction welder comprises a bed 1, a spindle head 2 mounted on the bed 1, a spindle 3 rotatably supported by the spindle head 2, a slide table 4 slidably mounted on the bed 1, fluid actuating means comprising a hydraulic cylinder 5 secured to the bed 1 and having reciprocally mounted therein a differential piston 6 having a pair of opposed working faces of different areas and which is connected with the slide table 4 by a connecting rod 7 for actuating the slide table, a pair of stationary chucks 8 and 9 mounted upon the slide table 4, and a chuck 10 secured to an inside terminal of the spindle 3. The spindle 3 is rotationally driven by a belt drive mechanism comprising a pulley 11 secured to a shaft of a motor 12 disposed to the bed 1, a pulley 13 secured to an outside terminal of the spindle 3 and a belt 14 for connecting pulleys 11 and 13. A workpiece 15 is rigidly supported by the chuck 10 and the other workpiece 16 is also rigidly supported by the stationary chuck 8 and 9. Therefore, the workpiece 16 can be moved towards the workpiece 15 by the sliding motion of the slide table 4 which is actuated by the fluid actuating means and may be brought into a pressure contact with the workpiece 15 during the operation of the friction welder. The workpiece 15 and the workpiece 16 are hereinafter referred to as "the first workpiece" and "the second workpiece," respectively.

Referring to FIG. 2 showing the hydraulic fluid circuit used in the apparatus of the present invention, an inlet of a hydraulic pump 17 is connected to a reservoir or pressure oil tank 18 and an outlet thereof is connected to a first solenoid or electromagnet valve 20 through a conduit 19. A feed conduit 21 connects the first electro magnet valve 20 with a high pressure reducing valve 22 and a second electromagnet valve 23 is connected to the reducing valve 22. A reducing valve 24 is branched off the feed pipe 21 and connected to a third electromagnet valve 25. The valves 23 and 25 are connected by a conduit 26, one branch of which forms a conduit 27 connected to a piston room 5a comprising the head end of the hydraulic cylinder 5 while another branch of which forms a connection to a fourth electromagnet valve 28. Another piston room 5b comprising the rod end of the hydraulic cylinder 5 is connected to the fourth electromagnet valve 28 by a conduit 29.

The first electromagnet valve 20 is connected to the fourth electromagnet valve 28 by a conduit 30, and a pressure gauge 31 is connected to the conduit 27.

A method for optionally selecting the first thrust force, during an initial stage of operation, which is required to generate heat by the frictional contact of the workpieces, or the second thrust force during a final stage of operation, which is required to operate the upset operation alternatively, is hereinafter illustrated in case of using the above-mentioned apparatus for the friction welder.

As mentioned above, it is possible to alternatively select optionally an oil pressure circuit which forms a high thrust force generating system or that of forming a low thrust force generating system by plural means for changing over the oil pressure of the oil pressure circuit which is connected to the hydraulic cylinder of the friction welder, respectively. In FIG. 3, the diagram A represents the relation between the thrust force applied to the workpieces and the gauge pressure of the oil in the oil pressure circuit which corresponds to a high thrust force generating system or high pressure mode of operation, while the diagram B represents that the relation between the gauge pressure of the oil in the oil pressure circuit which corresponds to a low thrust force generating system or low pressure mode of operation, according to the present invention. In the present invention, the first thrust force and the second thrust force can be optionally determined in one of the above-mentioned two systems respectively, or can be optionally determined in these two systems in a combined condition.

Referring to FIGS. 2, 3, 4A and 4B, in the case of generating the first or initial thrust force and the second or final thrust force by the high thrust force generating system, oil under pressure is fed to the conduit 19 by driving the hydraulic pump 17 of the friction welder. When the first electro magnet valve 20 is actuated from position (b) to (a) in FIG. 2, the pressurized oil is fed to the reducing valve 24 through the conduit 21, and next fed into the piston room 5a of the hydraulic cylinder 5 through the third electromagnet valve 25, the conduit 26 and the conduit 27, whereupon the first thrust force ($P_1$) generated by the high thrust force generating system is applied to the workpiece 16. In this condition, as the fourth electromagnet valve 28 is maintained in the position (a) in FIG. 2, the pressurized oil in the piston room 5b of the hydraulic cylinder 5 is discharged to the pressure oil tank 18 through the conduits 29 and 30. (see FIG. 4A.)

Next, when the third electro magnet valve 25 is actuated to position (a) and the second electromagnet valve 23 is also actuated to position (a) in FIG. 2, respectively, the pressurized oil is fed to the high pressure reducing valve, from the conduit 21, and then fed into the piston room 5a of the hydraulic cylinder 5 through the conduit 26 and the conduit 27. Thus, the second thrust force ($P_2$) generated by the high thrust force generating system is applied to the workpiece 16. (see FIG. 4B.)

Referring to FIGS. 2, 3, 4C, and 4D, in the case of generating the first thrust force and the second thrust force by the low thrust force generating system, the pressurized oil is fed to the conduit 21 from the hydraulic pump 17 through the conduit 19 and the first electromagnet valve 20 maintained in position (a) in FIG. 2, then fed to the conduit 26 through the low pressure reducing valve 24 and the third electro magnet valve 25. However, as the fourth electromagnet valve 28 is maintained in position (b) in FIG. 2, the pressurized oil is fed into the piston room 5a of the hydraulic cylinder 5 through the conduit 27 and further to the piston room 5b of the hydraulic cylinder 5 through the fourth electromagnet valve 28 and the conduit 29. Thus, the first thrust force ($P'_1$) generated by the low thrust force generating system, which is proportional to the difference between the piston areas receiving the pressurized fluid in the piston rooms 5a and 5b, is applied to the workpiece 16. (see FIG. 4C.)

Next, when the third electromagnet valve 25 is changed into position (a) in FIG. 2, the pressurized oil fed to the conduit 26 in the same manner as in case of the high thrust force generating system is simultaneously conducted to the both piston rooms 5a and 5b through the conduits 27, 29 respectively. Thus, the second thrust force ($P'_2$) of the low thrust force generating system, which is proportionate to a difference between the piston areas of receiving pressure in the piston rooms 5a and 5b, is loaded applied to workpiece 16. (see FIG. 4D.)

Figure 4A:
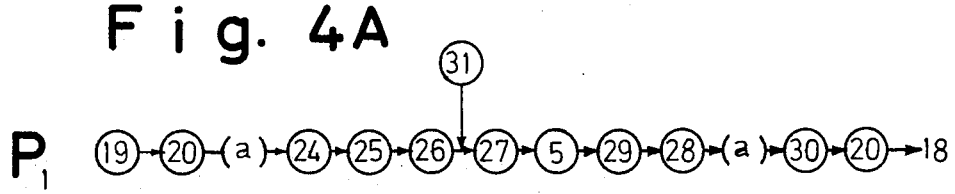
Figure 4B:
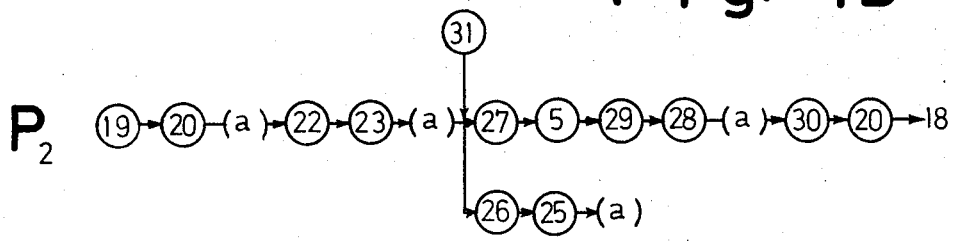
Figure 4C:
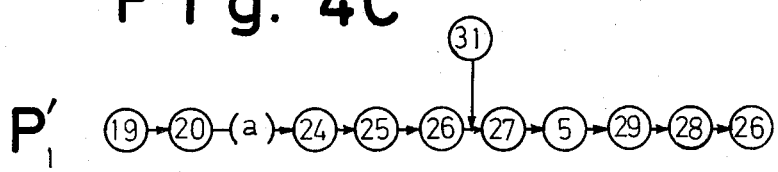
Figure 4D:
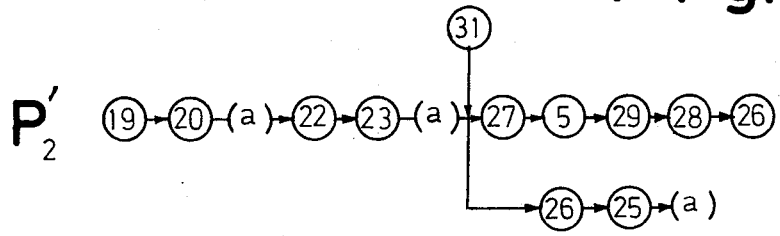

When it is preferable to combine the above-mentioned low and high thrust force generating systems, a combined high-low mode of operation may be obtained by generating the first thrust force by ($P'_1$) of the low thrust force generating system (see FIG. 4D) with and generating the second thrust force ($P_2$) of by the high thrust force generating system (see FIG. 4B).

As mentioned above, by means of applying the method and apparatus of the present invention, a suitable oil pressure control means can be optionally chosen from a plurality of oil pressure control means arranged in the pressure oil circuit of the optional selecting device attached to the friction welder. Therefore, any suitable thrust force between the workpieces can be optionally selected from the thrust force generating systems and the object of the present invention can be rationally attained.

While the invention has been described in conjunction with a certain embodiment thereof, it is to be understood that various modifications and changes may be made without departing from the spirit and scope of the invention.

What is claimed is:

1. A friction welding apparatus comprising: a rotationally driven spindle having means for releasably holding a first workpiece; a movably mounted slide member having means thereon for releasably holding a second workpiece; means mounting said slide member for translational movement towards and away from said spindle to effect aligned pressure contact between the first and second workpieces; fluid actuating means including a movable differential piston having a pair of opposed working faces of different areas connected to said slide member responsive to pressurized fluid supplied thereto to actuate said slide member; and fluid circuit means selectively and alternatively operable in one mode to supply pressurized fluid at one pressure level to one working face and exhaust fluid from the other working face of said differential piston and operable in another mode to supply pressurized fluid at said one pressure level to both said working faces of said differential piston to accordingly move said differential piston accompanied by a corresponding movement of said slide member to effect pressure contact between said first and second workpieces at one of two different pressure levels and wherein said fluid circuit means further includes means selectively and alternatively operable in a third mode to supply pressurized fluid at another pressure level greater than said one pressure level to one working face and exhaust fluid from the other working face of said differential piston and operable in a fourth mode to supply pressurized fluid at said another pressure level to both said working faces of said differential piston to accordingly move said differential piston accompanied by a corresponding movement of said slide member to effect pressure contact between said first and second workpieces at one of two different pressure levels each of which is different than the pressure levels obtained during said one and another modes of operation.

2. An apparatus according to claim 1; wherein said fluid circuit means comprises a reservoir of fluid, one source of pressurized fluid maintained at said one pressure level, another source of pressurized fluid maintained at said another pressure level, a conduit system communicating both working faces of said differential piston with both said one and another sources of pressurized fluid and said reservoir, valving means disposed within said conduit system selectively operable to communicate either said one source or said other source of pressurized fluid with each of said working faces of said differential piston, and a selector valve disposed within said conduit system selectively operable to prevent communication between one of said working faces of said differential piston and said valving means while communicating said one working face with said reservoir.

3. In a friction welder comprising a rotatable spindle mounted on a bed of said friction welder and provided with a chuck for rigidly holding a first workpiece, a slide table slidably mounted on said bed and provided with a chuck for rigidly holding a second workpiece, a hydraulic actuator secured to said bed and connected to said slide table in an actuating condition for effecting sliding of said slide table, and a hydraulic circuit including a hydraulic pressure source for actuating said hydraulic actuator; an apparatus for optionally selecting the level of a first thrust force for creating rotational rubbing contact of said first workpiece with said second workpiece and the level of a second thrust force for urging said second workpiece to said first workpiece comprising means within said hydraulic circuit comprising a first pressure generating system and a second pressure generating system, said first pressure generating system operative to create lower thrust forces than said second pressure generating system at a predetermined fluid pressure; control means disposed within said hydraulic circuit for controlling the pressure of the fluid used to actuate said hydraulic actuator at a low pressure to create said first thrust force and at a high pressure to create said second thrust force; and selecting means for optionally selecting said first thrust force and said second thrust force in said first pressure generating system and/or second pressure generating system.

4. In a friction welder according to claim 3; wherein said hydraulic actuator comprises a hydraulic cylinder, and a piston slidable within said hydraulic cylinder; and wherein said hydraulic circuit is provided with connecting conduits connected to cylindrical rooms formed at both sides of said piston of said hydraulic cylinder.

5. In a friction welder according to claim 4; wherein one of said first and second pressure generating systems includes means for effecting actuation of said hydraulic actuator in a normal double action manner in which the whole area of the piston is a pressure receiving area while the other of said first and second pressure generating systems includes means for effecting actuation of said hydraulic actuator in a differential action manner of which the area of a section only of the piston-rod is the effective pressure receiving area.

6. In a friction welder according to claim 3; wherein said control means includes a pressure reducing valve.

7. In a friction welder according to claim 3; wherein said selecting means comprises a first solenoid valve selectively operable for changing the direction of flow of pressurized fluid to said hydraulic cylinder through one of said two pressure generating systems, a second solenoid valve selectively operable for controlling said reducing valve to create said first thrust force, a third solenoid valve selectively operable for controlling said reducing valve to create said second thrust force, and a fourth solenoid valve optionally operable for alternatively applying one of said first and second pressure generating systems.

8. A friction welding apparatus comprising: rotatable means for releasably holding and rotating a first workpiece; a movably mounted slide member having means thereon for releasably holding a second workpiece; means mounting said slide member for translational movement towards and away from said rotatable means to effect aligned pressure contact between the first and second workpieces; fluid actuating means including a movable differential piston having a pair of opposed working faces of different areas connected to said slide member responsive to pressurized fluid supplied thereto to actuate said slide member; and a fluid circuit having means alternatively operable in a low pressure mode to sequentially supply pressurized fluid in an initial stage at one pressure level to both said working faces of said differential piston and then supply pressurized fluid in a final stage at another pressure level greater than said one pressure level to both said working faces of said differential piston to accordingly move said differential piston accompanied by a corresponding movement of said slidemember to sequentially effect pressure contact between said first and second workpieces at two different pressure levels, operable in a high pressure mode to sequentially supply pressurized fluid in an initial stage at said one pressure level to one working face and exhaust fluid from the other working face of said differential piston and then supply pressurized fluid in a final stage at said another pressure level to said one working face and exhaust fluid from said other working face of said differential piston to accordingly move said differential piston accompanied by a corresponding movement of said slide member to sequentially effect pressure contact between said first and second workpieces at two different pressure levels each of which is different than the contact pressure levels obtained during said low pressure mode, and operable in a combined high-low pressure mode to sequentially supply pressurized fluid in an initial stage at said one pressure level in accordance with the initial stage of one of said low and high pressure modes and then supply pressurized fluid in a final stage at said another pressure level in accordance with the final stage of the other of said low and high pressure modes to accordingly move said differential piston accompanied by a corresponding movement of said slide member to sequentially effect pressure contact between said first and second workpieces at two different contact pressure levels each of which corresponds to one of the stages in one of said low and high pressure modes.

9. An apparatus according to claim 8; wherein said fluid circuit comprises a reservoir receptive during use of the apparatus of a working fluid, a pump having an inlet connected to said reservoir and an outlet for delivering therefrom pressurized fluid, pressure reducing means in fluid communication with the pump outlet for reducing the pressurized fluid into one source of pressurized fluid maintained at said one pressure level and another source of pressurized fluid maintained at said another pressure level, and valving means for selectively valving the flow of pressurized fluid from said one source to said one and another working faces and selectively valving the flow of pressurized fluid from said another source to said one and another working faces.

* * * * *

UNITED STATES PATENT OFFICE
CERTIFICATE OF CORRECTION

Patent No. 3,698,617          Dated October 17, 1972

Inventor(s) Shigeo Fukaya and Nobuo Takagi

It is certified that error appears in the above-identified patent and that said Letters Patent are hereby corrected as shown below:

In the listing of inventors, line 2 thereof, "Duza Myochiazu Fukanhazama," should read -- Oaza Myochiaza Fukahazama, --; and in line 4 thereof, "Daza Ogahieaza" should read -- Oaza Ogakieaza --.

In the listing of foreign application priority data,

--Feb. 12, 1968   Japan . . . . . 43/8681 -- should be added.

Signed and sealed this 29th day of May 1973.

(SEAL)
Attest:

EDWARD M. FLETCHER, JR.          ROBERT GOTTSCHALK
Attesting Officer          Commissioner of Patents